US008858378B2

(12) United States Patent
Long et al.

(10) Patent No.: US 8,858,378 B2
(45) Date of Patent: Oct. 14, 2014

(54) ELECTRONICALLY CONTROLLED RANGE VALVE FOR MULTI-SPEED PLANETARY TRANSMISSION

(71) Applicant: Allison Transmission, Inc., Indianapolis, IN (US)

(72) Inventors: Charles F. Long, Pittsboro, IN (US); Charles T. Taylor, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 13/764,058

(22) Filed: Feb. 11, 2013

(65) Prior Publication Data

US 2013/0145883 A1     Jun. 13, 2013

Related U.S. Application Data

(63) Continuation of application No. 12/510,487, filed on Jul. 28, 2009, now Pat. No. 8,371,988.

(51) Int. Cl.
  *F16H 61/18*      (2006.01)
  *F16H 61/02*      (2006.01)
  *F16H 59/04*      (2006.01)
  *F16H 61/12*      (2010.01)
  *F16H 61/686*     (2006.01)

(52) U.S. Cl.
  CPC .......... *F16H 59/045* (2013.01); *F16H 61/0206* (2013.01); *F16H 2061/1204* (2013.01); *F16H 2200/0052* (2013.01); *F16H 61/686* (2013.01); *F16H 61/12* (2013.01)
  USPC ......................................................... 475/116

(58) Field of Classification Search
  USPC .................................. 475/116, 128; 477/906
  See application file for complete search history.

(56) References Cited

U.S. PATENT DOCUMENTS

| 4,070,927 | A |   | 1/1978  | Polak |
|-----------|---|---|---------|-------|
| 4,075,912 | A | * | 2/1978  | Schaefer ........................ 477/125 |
| 4,391,166 | A | * | 7/1983  | Kubo et al. ...................... 477/64 |
| 5,601,506 | A |   | 2/1997  | Long et al. |
| 5,616,093 | A |   | 4/1997  | Long et al. |
| 5,679,086 | A | * | 10/1997 | Ando et al. ................... 475/116 |
| 6,319,164 | B1|   | 11/2001 | Runde et al. |
| 6,656,075 | B2| * | 12/2003 | Park et al. ..................... 475/128 |

(Continued)

FOREIGN PATENT DOCUMENTS

| DE | 102007025997 A1 |   | 1/2008 |
| DE | 102008047137 A1 |   | 4/2009 |
| EP |        412711 A1 | * | 2/1991 |

OTHER PUBLICATIONS

International Search Report and Written Opinion received for International Patent Application No. PCT/US2010/040162, mailed Sep. 1, 2010, 8 pages.

*Primary Examiner* — Robert A Siconolfi
*Assistant Examiner* — Huan Le
(74) *Attorney, Agent, or Firm* — Barnes & Thornburg LLP

(57) ABSTRACT

A shift by wire control for a multi-speed vehicle transmission is provided. The control includes a shift by wire shift valve in fluid communication with other shift valves and clutch trim valves to provide double blocking features in the neutral range and a reverse range. The shift by wire valve is configured with multiple differential areas to provide failure modes for all forward ranges.

21 Claims, 13 Drawing Sheets

(56) References Cited

U.S. PATENT DOCUMENTS

| | | |
|---|---|---|
| 7,878,934 B2 * | 2/2011 | Lee .............................. 475/128 |
| 7,980,995 B2 | 7/2011 | Weber et al. |
| 8,371,988 B2 | 2/2013 | Long et al. |
| 2003/0027678 A1 | 2/2003 | Long et al. |
| 2003/0114261 A1 | 6/2003 | Moorman et al. |
| 2006/0094555 A1 | 5/2006 | Long et al. |
| 2007/0167283 A1 * | 7/2007 | Sato et al. .................... 477/156 |
| 2007/0281816 A1 | 12/2007 | Long et al. |
| 2008/0176700 A1 | 7/2008 | Long et al. |
| 2008/0190228 A1 * | 8/2008 | Long et al. ..................... 74/331 |
| 2009/0075772 A1 | 3/2009 | Ellis et al. |
| 2011/0028270 A1 | 2/2011 | Long et al. |

* cited by examiner

ELECTRONICALLY CONTROLLED RANGE VALVE FOR MULTI-SPEED PLANETARY TRANSMISSION

RELATED APPLICATIONS

This application is a continuation of and claims priority to U.S. patent application Ser. No. 12/510,487, filed Jul. 28, 2009, now projected U.S. Pat. No. 8,371,988, which is incorporated herein by this reference in its entirety.

BACKGROUND

An electro-hydraulic control system controls shifting and operation of automatic vehicle transmissions. To permit shifting by the vehicle operator, the electro-hydraulic control system typically includes either a manual valve or a shift by wire valve.

In a manual valve electro-hydraulic control system, the vehicle operator manually changes the position of the valve to accomplish certain shifts, for example, to initiate movement of the vehicle from a non-moving state to a moving state or vice versa, or to change the direction in which the vehicle is moving (i.e., shifts from neutral to a forward range, from neutral to a reverse range, from a reverse range to a forward range, from a reverse range to neutral, from a forward range to neutral, or from a forward range to a reverse range).

In a shift by wire control system, at least some of the inputs that are used to initiate shifting are in the form of electrical signals rather than hydraulic or mechanical forces. Instead of a manual shift selector, a push button range selector may be used in a shift by wire system. Activation of a push button or similar actuator by the vehicle operator sends an electrical signal to an electronic control unit. The electronic control unit executes computer logic to determine which valve(s) in the electro-hydraulic control system need to change position in order for pressurized hydraulic fluid to be directed to the appropriate clutches to accomplish the requested shift. The electronic control unit sends electrical signals to solenoid valves of the electro-hydraulic control system, which initiate the valve position changes required to accomplish the requested shift.

SUMMARY

According to one aspect of the present invention, an electro-hydraulic control for a multi-speed vehicle transmission is provided. The electro-hydraulic control includes an electrical control configured to receive shift request signals from an electronic range selector of the transmission, first, second, and third electro-hydraulic actuators each configured to receive electrical signals from the electrical control, first, second and third shift valves each being in fluid communication with the first, second, and third electro-hydraulic actuators to receive pressurized hydraulic fluid output by the electro-hydraulic actuators and being in fluid communication with each other to selectively deliver pressurized hydraulic fluid to at least one shift mechanism of the transmission, a fourth electro-hydraulic actuator configured to receive electrical signals from the electrical control, a fourth shift valve configured to selectively deliver pressurized hydraulic fluid to at least one shift mechanism of the transmission, the fourth shift valve being controllable by the fourth electro-hydraulic actuator to achieve a first position when the fourth electro-hydraulic actuator is not electrically actuated and a second position when the fourth electro-hydraulic actuator is electrically actuated, and a plurality of fluid passages selectively coupling the first, second, third, and fourth shift valves such that a neutral or reverse range can be achieved by the transmission when the fourth shift valve is in either the first position or the second position, and a forward range can be achieved by the transmission only when the fourth shift valve is in the second position.

The fourth shift valve may have a first fluid chamber fluidly coupled to a first shift mechanism and a second fluid chamber fluidly coupled to a second shift mechanism, where the first shift valve has a third fluid chamber fluidly coupled to a third shift mechanism, the third shift valve has a fourth fluid chamber fluidly coupled to a fourth shift mechanism, and the first shift valve has a fifth fluid chamber fluidly coupled to a fifth shift mechanism of the transmission. The second shift valve may be fluidly coupled to the third shift mechanism through the first and third shift valves in a first reverse range and the second shift valve may be fluidly coupled to the fifth shift mechanism through the first, third, and fourth shift valves in a second reverse range.

The electro-hydraulic control may include a torque converter clutch control valve, wherein the torque converter clutch control valve is coupled to at least one of the first, second, third and fourth shift valves.

The plurality of fluid passages may selectively couple the first, second, third, and fourth shift valves such that a first reverse range can be achieved whether the fourth shift valve is in the first position or the second position. The plurality of fluid passages may selectively couple the first, second, third, and fourth shift valves such that a neutral range can be achieved whether the fourth shift valve is in the first position or the second position. The plurality of fluid passages may selectively couple the first, second, third and fourth shift valves such that at least two of the shift valves are required to change position in order for the transmission to shift from a neutral range to a forward range.

The electro-hydraulic control may include first and second trim systems each configured to receive electrical signals from the electrical control and control the rate at which fluid pressure is delivered to the shift mechanisms of the transmission via the first, second, third, and fourth shift valves, wherein the first trim system is directly fluidly coupled to the first shift valve, the second trim system is directly fluidly coupled to the second shift valve, the second trim system is fluidly coupled to the third shift valve via the second shift valve, and the second trim system is fluidly coupled to the first shift valve via the second and third shift valves.

The fluid passages may selectively couple the first, second, third and fourth shift valves such that at least one of the trim systems and at least one of the shift valves are required to be actuated in order for the transmission to shift from a neutral range to a reverse range.

According to another aspect, an electro-hydraulic control for a multi-speed vehicle transmission is provided, including an electrical control configured to receive shift request signals from an electronic range selector of the transmission, at least one trim system actuatable by the electrical control to control the rate of delivery of pressurized hydraulic fluid to at least one shift mechanism of the transmission, first, second, and third electro-hydraulic actuators each configured to receive electrical signals from the electrical control, first, second and third shift valves each being in fluid communication with the first, second, and third electro-hydraulic actuators to receive pressurized hydraulic fluid output by the electro-hydraulic actuators and being in fluid communication with each other to selectively deliver pressurized hydraulic fluid to at least one shift mechanism of the transmission, a fourth electro-hydraulic actuator configured to receive electrical signals from the electrical control, and a fourth shift valve configured to selectively deliver pressurized hydraulic fluid to first and second shift mechanisms of the transmission, the fourth shift valve being controllable by the fourth electro-hydraulic actuator to achieve a first position when the fourth electro-hydraulic actuator is not electrically actuated and a second position when the fourth electro-hydraulic actuator is electrically actuated, the fourth shift valve being configured to maintain the first position if the fourth shift valve is in the first position when an electrical failure occurs, and the fourth shift valve being configured to maintain the second position if the fourth shift valve is in the second position and a trim system is actuated when an electrical failure occurs.

The fourth shift valve may have at least first, second and third spaced-apart lands, where the first and second lands define a second fluid chamber that is in fluid communication with the second shift mechanism and the second and third lands define a first fluid chamber that is in fluid communication with the first shift mechanism. Fluid in the first and second fluid chambers of the fourth shift valve may be at an exhaust pressure in neutral and reverse ranges during normal operation and also during an electrical failure.

The first land may have a first diameter, the second land may have a second diameter, the third land may have a third diameter, where the second diameter is larger than the first diameter, and the third diameter is larger than the second diameter. The electro-hydraulic control may apply fluid pressure to a differential area of the third land of the fourth shift valve to keep the fourth shift valve in the second position during an electrical failure occurring in a low forward range. The low forward range may be a forward range lower than a fourth forward range. The electro-hydraulic control may apply fluid pressure to a differential area of the second land of the fourth shift valve to keep the fourth shift valve in the second position during an electrical failure occurring in a high forward range. The high forward range may be a forward range higher than a third forward range.

According to another aspect, an electro-hydraulic control for a multi-speed vehicle transmission is provided, including an electrical control configured to receive shift request signals from an electronic range selector of the transmission, at least one trim system actuatable by the electrical control to control the rate of delivery of pressurized hydraulic fluid to at least one shift mechanism of the transmission, a plurality of electro-hydraulic actuators each configured to receive electrical signals from the electrical control, a plurality of shift valves each being in fluid communication with an electro-hydraulic actuator to receive pressurized hydraulic fluid output by the electro-hydraulic actuator and being in fluid communication with at least one trim system and each other to selectively deliver pressurized hydraulic fluid to at least one shift mechanism of the transmission, a shift by wire shift valve configured to selectively deliver pressurized hydraulic fluid to at least one shift mechanism of the transmission, and a plurality of fluid passages selectively coupling the first, second, third, and fourth shift valves, the at least one trim system, and the shift by wire valve to provide a neutral range in which the neutral range is maintained unless a change in position of at least one of the shift valves or shift by wire valve and actuation of at least one of the trim systems occurs.

The shift by wire valve may have a first position in which it is not electrically actuated and a second position in which it is electrically actuated. The neutral range may be achievable whether the shift by wire valve is in the first position or the second position. The at least one trim system may be in direct fluid communication with at least one of the shift valves other than the shift by wire valve.

Patentable subject matter may include one or more features or combinations of features shown or described anywhere in this disclosure including the written description, drawings, and claims.

BRIEF DESCRIPTION OF THE DRAWINGS

The detailed description refers to the following figures in which.

In general, like structural elements on different figures refer to identical or functionally similar structural elements, although reference numbers may be omitted from certain views of the drawings for ease of illustration.

DETAILED DESCRIPTION

Aspects of the present invention are described with reference to certain illustrative embodiments shown in the accompanying drawings and described herein. While the present invention is described with reference to the illustrative embodiments, it should be understood that the present invention as claimed is not limited to the disclosed embodiments.

Figure 1:
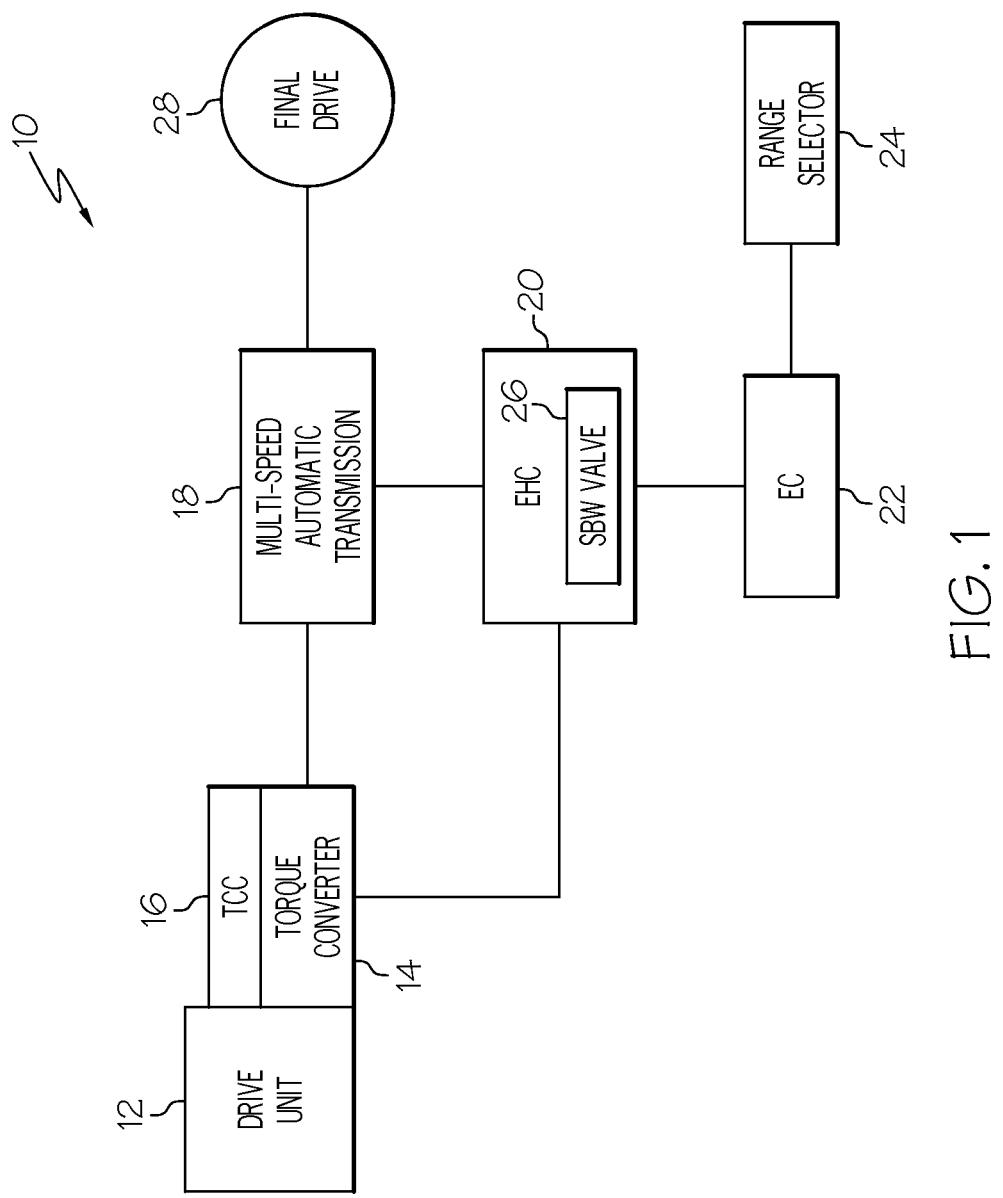
FIG. 1 is a simplified block diagram of a motor vehicle powertrain including an electro-hydraulic control system having an electronically controlled range valve in accordance with the present invention.

FIG. 1 depicts a simplified block diagram of an electro-hydraulic transmission control 20 including a shift by wire valve 26, in the context of an exemplary vehicle powertrain 10. The lines shown as connecting blocks 12, 14, 16, 18, 20, 22, 24, 26, 28 of powertrain 10 represent connections which, in practice, may include one or more electrical, mechanical and/or fluid connections, passages, couplings or linkages, as will be understood by those skilled in the art and as described herein.

Powertrain 10 includes drive unit 12, torque converter 14, torque converter clutch 16, transmission 18, electro-hydraulic control 20, electronic control 22, range selector 24, and final drive 28. Drive unit 12 generally provides a torque output to torque converter 14. Drive unit 12 may be an internal combustion engine of a compression-ignition type (i.e. diesel) or a spark-ignition type (i.e. gasoline), a hybrid unit, or other suitable unit for generating torque output to drive a vehicle.

Torque converter 14 selectively establishes a coupling between drive unit 12 and transmission 18 to convert and/or transfer the torque output from drive unit 12 to the vehicle transmission 18. Such coupling is a fluid coupling when torque converter clutch 16 is not applied, and a mechanical coupling when torque converter clutch is applied. Torque converter clutches are often provided to effect unitary rotation of the torque converter pump and turbine in response to reduced hydraulic pressure within the torque converter, which may occur when "slip" (i.e., a difference in rotational speed) between the torque converter pump and turbine is not required.

Transmission 18 includes an input shaft, an output shaft, an assembly of gears, and a plurality of gear-shifting mechanisms that are selectively engaged and disengaged by electro-hydraulic transmission control 20 to cause the vehicle to assume one of a plurality of operational modes or ranges including at least six forward speed ratios, a neutral range, and at least one reverse range. As such, the shift mechanisms of transmission 18 are in fluid communication with hydraulic control elements of control 20.

In this disclosure, the term "shift mechanism" may be used to refer to one or more clutches, brakes, or other friction elements or devices, or similar suitable mechanisms configured to cause the transmission to switch from one range or gear ratio to another, different range or gear ratio.

Control 20 includes a two-position shift valve 26 that allows for shifting into reverse and neutral ranges when in one position and allows for shifting into forward ranges when in its other position. In the illustrated embodiment, reverse and neutral ranges are achieved when shift valve 26 is in an off or de-actuated position and forward ranges are achievable when shift valve 26 is in the on or actuated position. Thus, shift valve 26 can control three modes of operation (reverse, neutral, and forward ranges) with only two positions. The structure and operation of shift valve 26 is described in more detail below.

The embodiment of control 20 including shift valve 26 shown in FIGS. 2-13 relates to a six-speed vehicle transmission that includes three planetary gearsets and five shift mechanisms (e.g. two rotating shift mechanisms and three stationary shift mechanisms C1, C2, C3, C4, C5). During normal operation of transmission 18, two shift mechanisms are engaged in each range except neutral. An illustrative embodiment of transmission 18 is disclosed in U.S. Pat. No. 4,070,927 to Polak, which is incorporated herein by this reference. Those of ordinary skill in the art will understand that such transmission is offered only as an example, and that aspects of the present invention are applicable to other multi-speed vehicle transmissions. In the illustrated embodiment, transmission 18 has a shift schedule as shown in Table 1 below.

TABLE 1

| Range | Clutches Applied |
|---|---|
| Reverse | C3, C5 |
| Neutral | C5 |
| $1^{st}$ | C1, C5 |
| $2^{nd}$ | C1, C4 |
| $3^{rd}$ | C1, C3 |
| $4^{th}$ | C1, C2 |
| $5^{th}$ | C2, C3 |
| $6^{th}$ | C2, C4 |

While the illustrated embodiment specifies a particular shift schedule, it will be understood that in other embodiments, other combinations of shift mechanisms C1, C2, C3, C4, and C5 may be applied and released to achieve particular operating ranges of the transmission.

The torque output by transmission 18 is applied to the final drive 28. The final drive 20 generally includes the drive wheels and driven load mass carried by the vehicle. Characteristics of final drive 20 may vary considerably over the course of the vehicle's use, as may be the case particularly with commercial vehicles such as trucks, buses, emergency vehicles, and the like.

Electrical control 22 controls operation of transmission 18 based on inputs from one or more components of drive unit 12, torque converter 14, transmission 18, range selector 24; and/or other inputs. Such inputs may include electrical digital and/or analog signals received from sensors, controls or other like devices associated with the vehicle components. For instance, inputs may include signals indicative of transmission input speed, driver requested torque, engine output torque, engine speed, temperature of the hydraulic fluid, transmission output speed, turbine speed, brake position, gear ratio, torque converter slip, and/or other measurable parameters.

Electrical control 22 generally includes electrical circuitry configured to process, analyze or evaluate one or more of the inputs and issue electrical control signals to appropriate components of electro-hydraulic control system 20, as needed, through one or more electrical lines, conductors, or other suitable connections. Such connections may include hardwired and/or networked components in any suitable configuration including, for example, insulated wiring and/or wireless transmission as may be appropriate or desired.

Range selector 24 issues signals or commands indicative of a selected or desired operational mode of the vehicle, i.e., a selected or desired forward speed ratio, a desired reverse range, or neutral. In the illustrated embodiment, range selector 24 is an electronically-controlled or "shift-by-wire" range selecting mechanism, rather than a manual selector.

As shown in FIGS. 2-16, control 20 includes two-position shift valve 26, three additional shift valves 36, 38, 40, and three clutch pressure control or "trim" systems 30, 32, and 34.

Fluid circuits, including a main pressure circuit 60, a control pressure circuit 62, and an exhaust circuit 64, are coupled to a source of pressurized fluid (not shown). Fluid circuits 60, 62, 64 fluidly couple the hydraulic components of control 20 to one another as shown and described below.

During operation of a vehicle into which control 20 is incorporated, main pressure circuit 60 draws hydraulic fluid at a main pressure from a fluid supply, such as a sump or reservoir (not shown). In general, the main pressure defines a range including a minimum system pressure and a maximum system pressure for main pressure circuit 60. In the illustrated embodiment, the main pressure is in the range of about 50-250 pounds per square inch (psi). In the drawings, main pressure is denoted using a backward-slash pattern.

Control pressure circuit 62 circulates hydraulic fluid at a control pressure, which is typically regulated by a regulator or modulator valve as will be understood. In the illustrated embodiment, the control pressure is generally in the range of about 50-110 psi. Control pressure is denoted in the drawings by a dotted pattern.

Exhaust circuit 64 is in fluid communication with components of control 20 as shown in the drawings. Exhaust pressure is in the range of about zero psi. Exhaust circuit 64 is operably coupled to an exhaust backfill regulator valve 44. The EBF valve 44 provides an exhaust backfill pressure, which is configured to prevent air from entering exhausted clutches. In the illustrated embodiment, the exhaust backfill pressure is generally in the range of about 2 psi. In the drawings, exhaust pressure is denoted by a forward-slash pattern.

Also shown are restrictors or orifices 80, 82, 84, 86, 88. The restrictors or orifices 80, 82, 84, 86, 88 are positioned in fluid passages to alter or moderate the rate of fluid flow through the passages or a portion thereof, in order to control the rate at which pressure in a fluid passage changes. These elements are typically used to provide additional control over fluid pressure in the passages. For example, series of orifices 80, 82, 84 are used to prevent actuation of pressure switches 72, 74, 76 from occurring until their corresponding shift valve 38, 40, 26 is fully stroked.

Electro-hydraulic actuators 50, 52, 54, 56, and pressure switches 70, 72, 74, 76 are in fluid communication with each of the shift valves 36, 38, 40, 26, respectively. It will be understood that actuators 50, 52, 54, 56, and pressure switches 70, 72, 74, 76 are electrically coupled to control 22, although for ease understanding these electrical connections are not shown in FIGS. 2-16.

In general, each of the valves of control 20 includes a valve head, a valve spool, at least one valve land interposed between portions of the valve spool or between the valve head and a portion of the valve spool, and a return spring disposed in a spring chamber. Each valve spool is axially translatable in a valve bore in response to changes in fluid pressure or fluid flow through the various passages of control 20. For ease of illustration, the valve bores have been omitted from the figures.

The valve lands each define a diameter that is greater than the diameter defined by the valve spool, such that surfaces of the lands may slidably engage interior surfaces of the valve bore when the valve spool translates within the valve bore. Spool portions between valve lands may selectively connect fluid passages to other fluid passages, or connect fluid passages to fluid chambers, depending on the position of the valve.

Each of shift valves 36, 38, 40 has more than four spaced-apart lands that define at least four fluid chambers therebetween. Shift valve 26 has four spaced-apart lands that define three fluid chambers therebetween.

Figure 8:
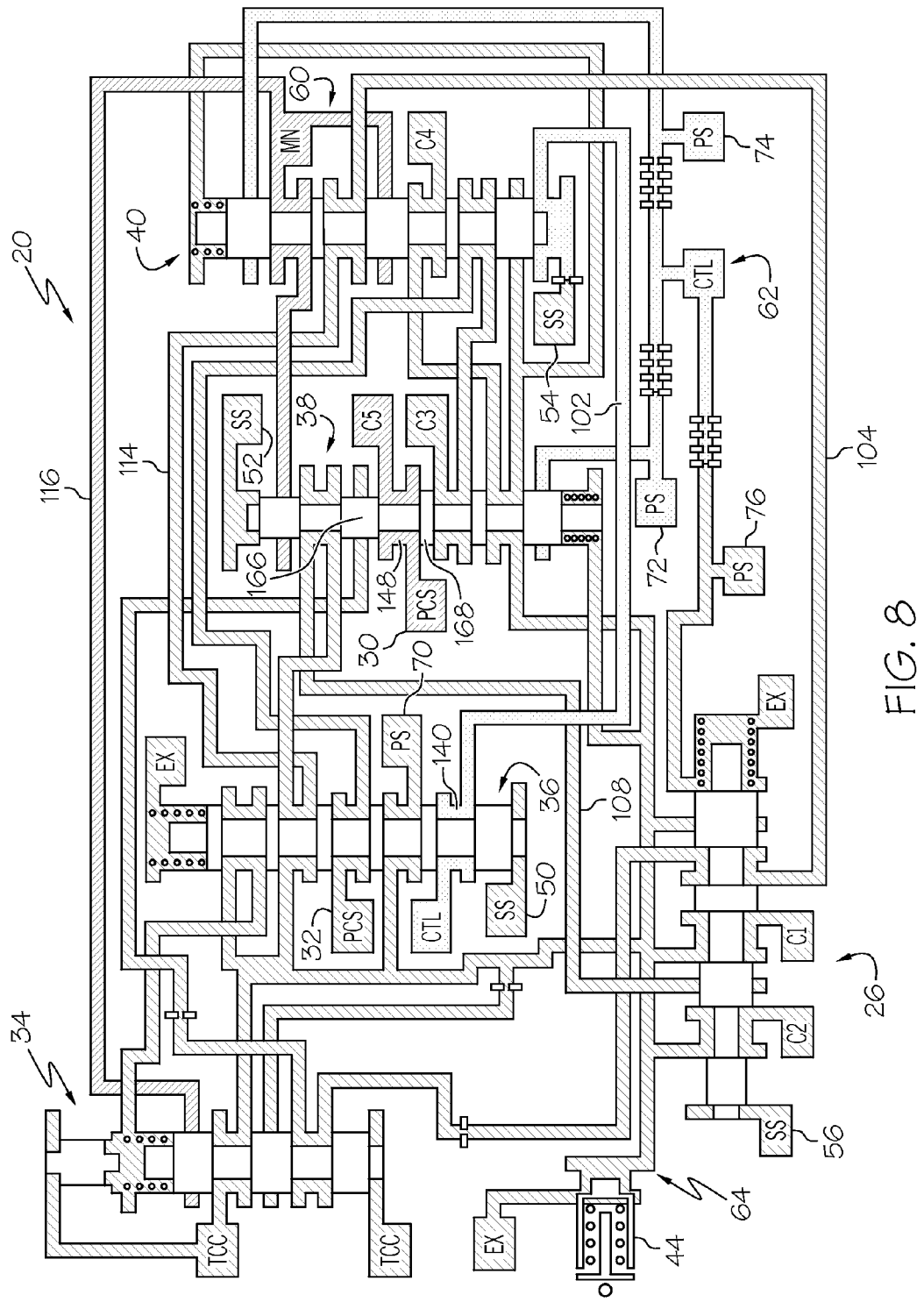
FIG. 8 is a schematic diagram of the embodiment of FIG. 2, showing a fluid passage arrangement and fluid pressure configuration for the reverse range of FIG. 2, in a failure mode in response to an electrical failure.
Figure 10:
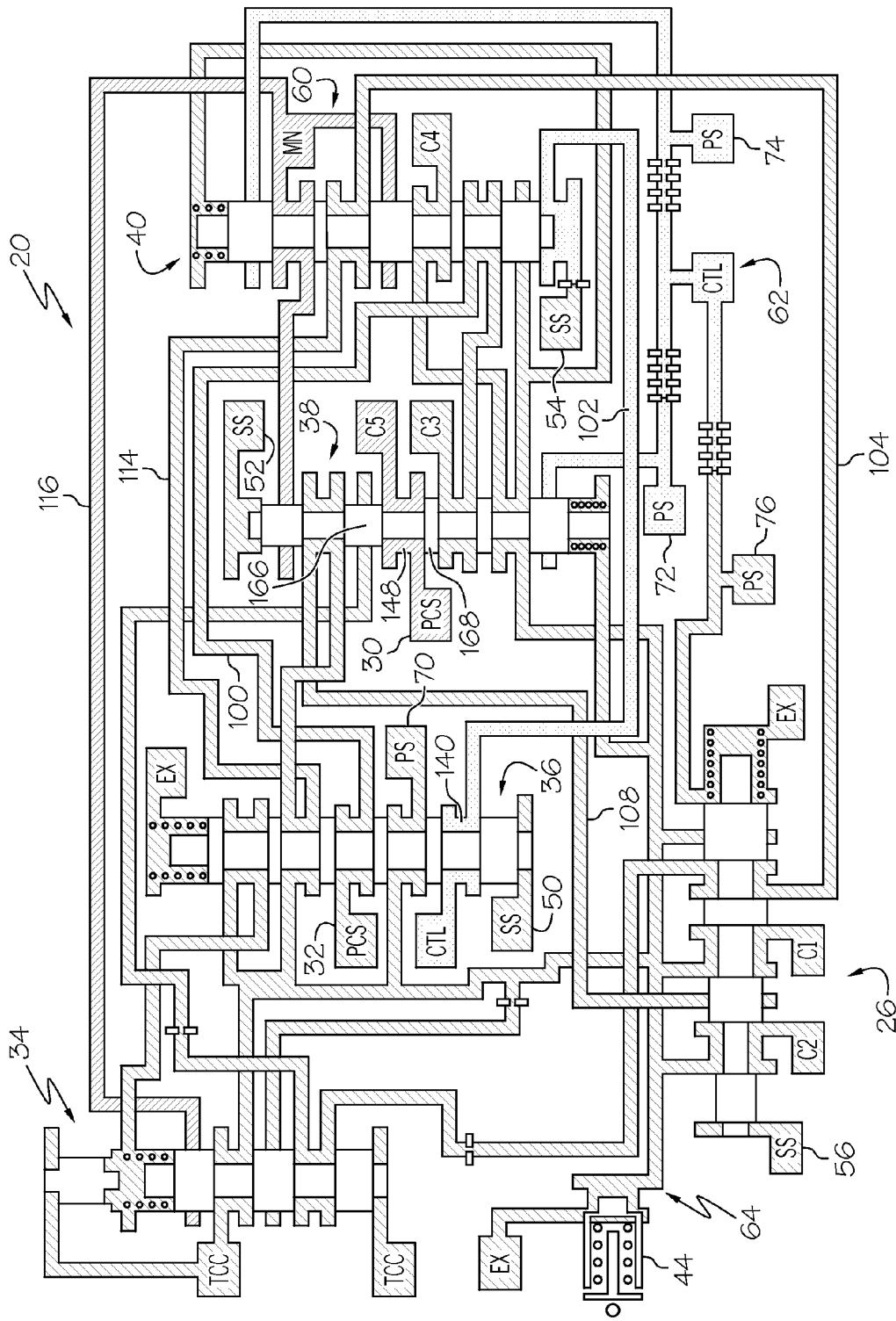
FIG. 10 is a schematic diagram of the embodiment of FIG. 2, showing a fluid passage arrangement and fluid pressure configuration for the neutral range of FIG. 4, in a failure mode in response to an electrical failure.

Shift valves 36 and 40 are generally single-diameter shift valves, meaning that all of the valve's lands have substantially the same diameter or there is no pressure differential. Shift valve 38 is a two-diameter shift valve, with land 166 having a smaller diameter than land 168, as best shown in FIGS. 8 and 10. The land above land 166 (nearest the valve head) on shift valve 38 has substantially the same diameter as land 166, and the lands below land 168 (nearer to the return spring) have substantially the same diameter as land 168.

Figure 11:
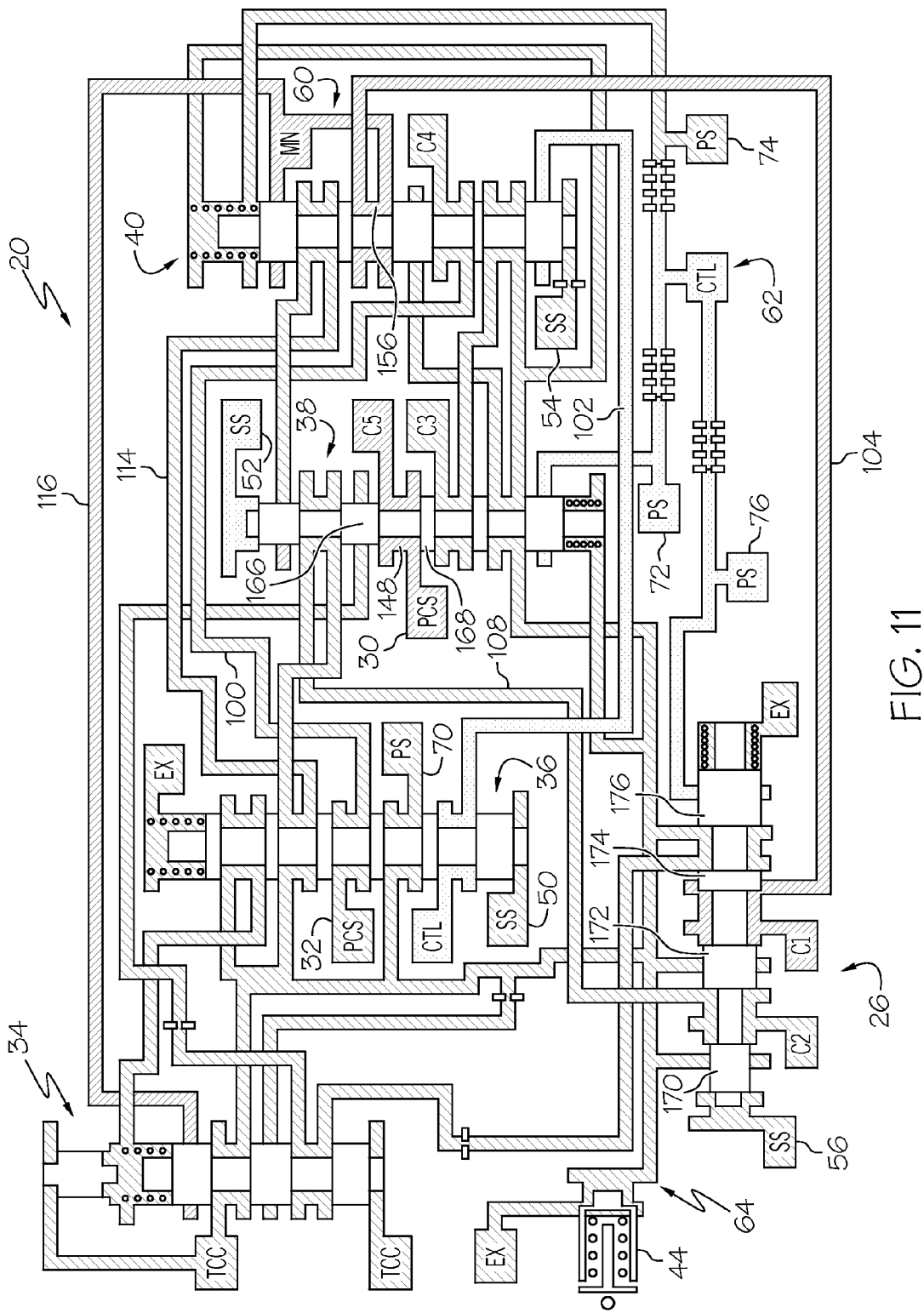
FIG. 11 is a schematic diagram of the embodiment of FIG. 2, showing a fluid passage arrangement and fluid pressure configuration for the first forward range of FIG. 5, in a failure mode after an electrical failure.
Figure 12:
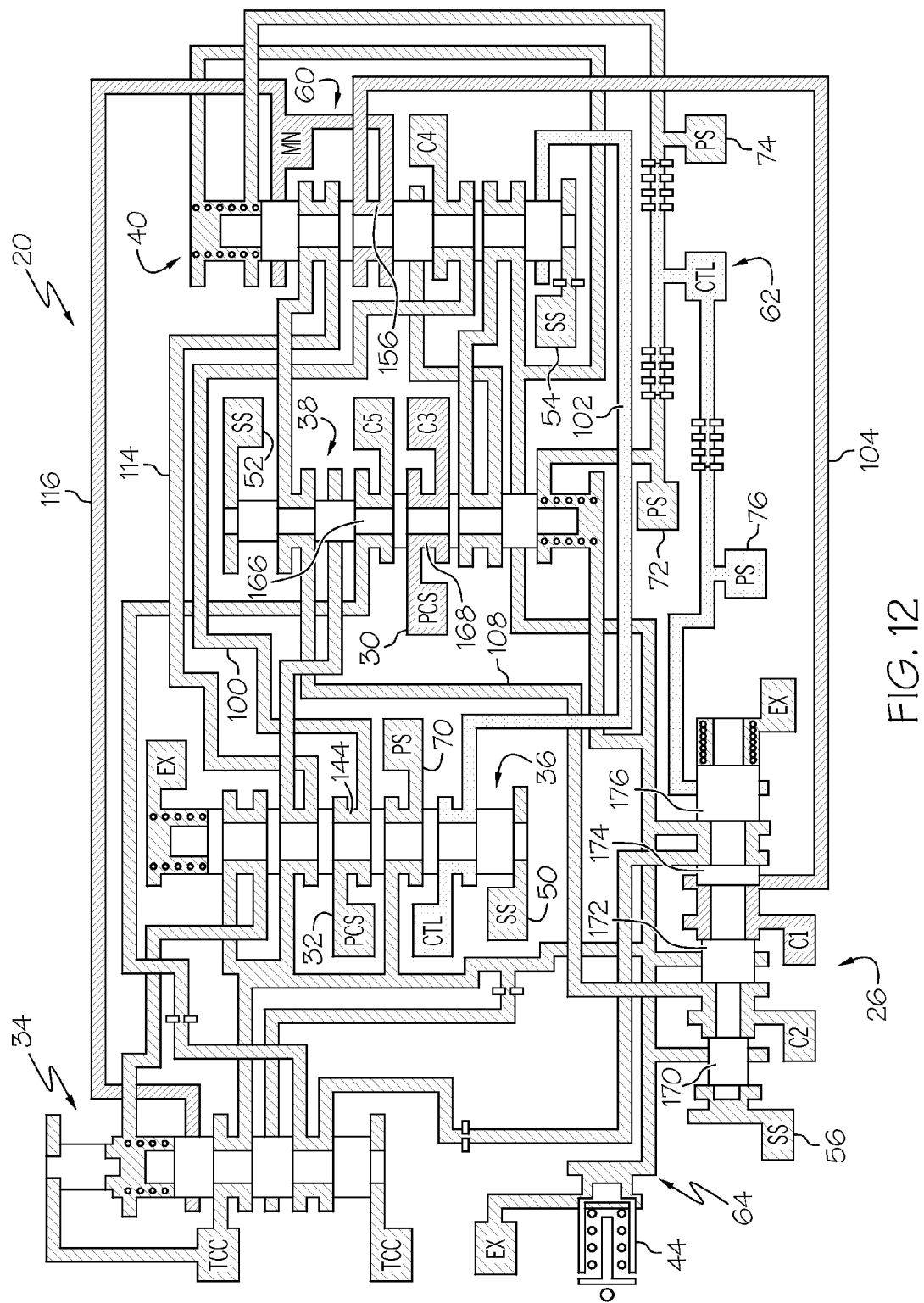
FIG. 12 is a schematic diagram of the embodiment of FIG. 2, showing a fluid passage arrangement and fluid pressure configuration of the second forward range of FIG. 6, in a failure mode after an electrical failure.
Figure 13:
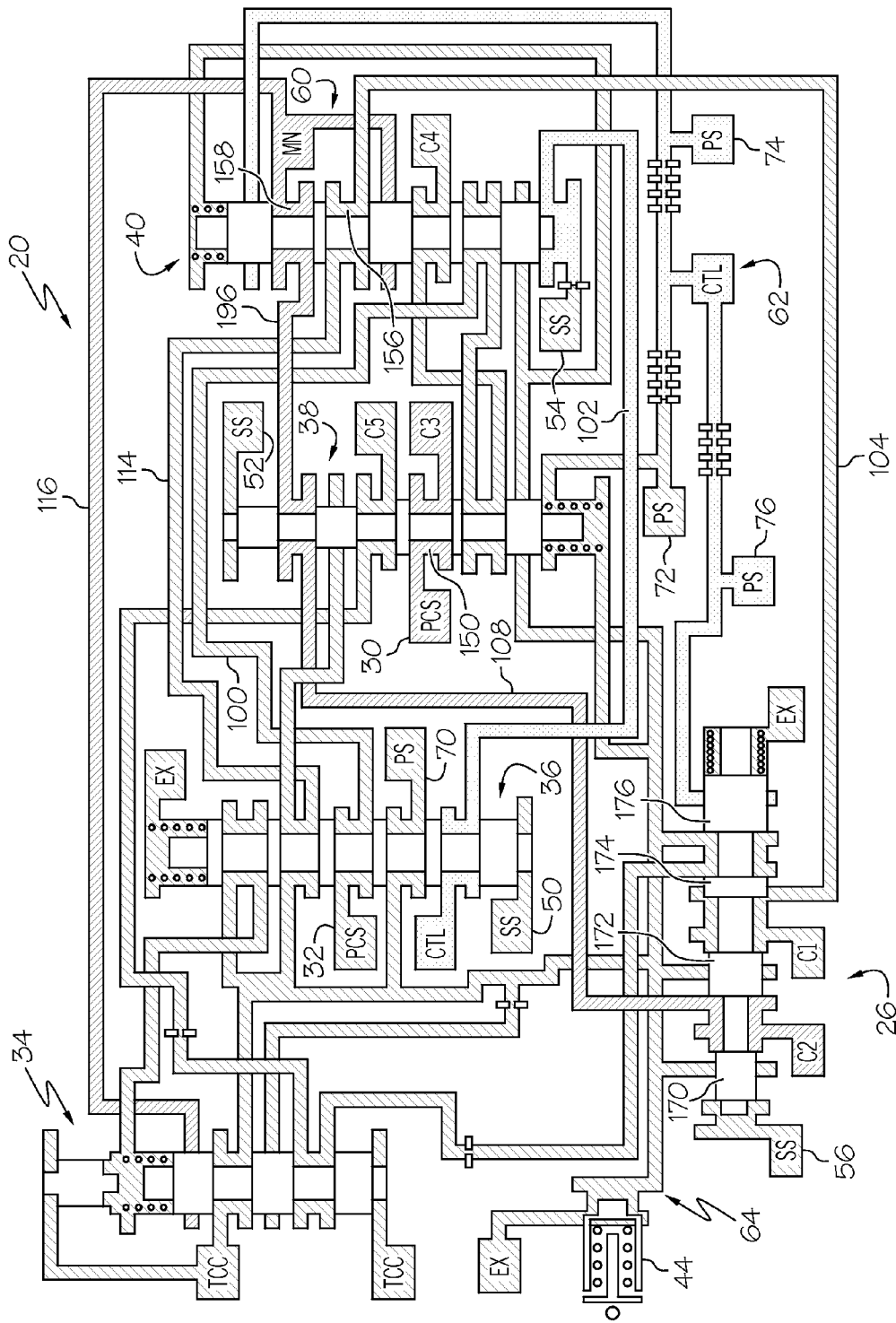
FIG. 13 is a schematic diagram of the embodiment of FIG. 2, showing a fluid passage arrangement and fluid pressure configuration of the fourth forward range of FIG. 7, in a failure mode after an electrical failure.

Shift valve 26 is a three-diameter shift valve. Land 172 has a larger diameter than land 170, and land 174 has a larger diameter than land 172 as best shown in FIGS. 11-13. Land 176 has substantially the same diameter as land 174. The height of land 174 is smaller than the heights of the other lands 170, 172 and 176.

The multiple diameters on shift valves 26, 38 allow control 20 to use valve latching to provide failure recovery from any range of transmission 18 in the event of an electrical failure. The latching features on shift valve 26 additionally serve to hold shift valve 26 in the stroked position as long as a forward range is commanded, thereby preventing an unintended shift out of a forward range in the event that shift valve 26 fails. These latching features of shift valves 26, 38 are described in greater detail below.

As is well known, return springs 180, 182, 184, 186, 188 bias their respective valve in a destroked position. Changes in fluid pressure or fluid flow in selected fluid passages may cause the valve spool to translate within the valve bore, causing the return spring to partially or fully compress.

Responsive to the output of actuators 50, 52, 54, 56, shift valves 36, 38, 40, 26 are slidable between the destroked position and a stroked position, where the stroked position is one in which the return spring is fully compressed. In the illustrated embodiment, each of actuators 50, 52, 54, 56 is a solenoid valve of the on/off type. The positioning of the shift valves 36, 38, 40, 26 determines which of the shift mechanisms C1, C2, C3, C4, C5 receive fluid pressure and which do not, thereby controlling which shift mechanisms are applied and which are released at any given time.

The pressure control valves of clutch trim systems 30, 32, 34 are configured to assume intermediate positions between the first and second positions, in which the return spring is partially compressed, in addition to the first and second positions. As will be understood, the displacement of the pressure control valves of the clutch trim systems 30, 32, 34 is controlled by electro-hydraulic actuators that have a variable output pressure, such as variable-bleed solenoids. Because the rate of application of fluid pressure can be controlled in this way, clutch trim systems 30, 32, 34 control the rate at which a shift mechanism is applied or released. Clutch trim systems 30 and 32 control the rate of application or release of the shift mechanisms C1, C2, C3, C4, C5 (depending on the positioning of the shift valves 26, 36, 38, 40), while clutch trim system 34 controls the rate of application or release of torque converter clutch 14.

Actuators 50, 52, 54, 56 and the variable-output electro-hydraulic actuators of the clutch trim systems 30, 32, 34 are operably coupled to control 22 to receive electrical signals (i.e. electrical current) therefrom. The electrical signals generated and sent by control 22 to the electro-hydraulic actuators of control 20 selectively actuate the valves (in response to driver input or other inputs) to accomplish shifting of transmission 18.

Each of the electro-hydraulic actuators of control 20 is either of the normally low type or of the normally high type. A normally low (or normally off) solenoid valve provides maximum output pressure when it receives electrical input and provides zero or minimum output pressure when no electrical input is received; while a normally high (or normally on) solenoid valve provides maximum output pressure when it is not receiving any electrical input and provides zero or minimum output pressure when electrical input is provided. Thus, as used herein, when referring to an actuator or solenoid valve as being "actuated," this means either that electrical input is supplied to the solenoid (as in the case of normally low solenoids) or that electrical input is not supplied to the solenoid (as in the case of normally high solenoids).

In the illustrated embodiment, each of actuators 50, 52, 54, 56 is a normally low solenoid, the electro-hydraulic actuators of trim systems 32 and 34 are normally low solenoids, and the electro-hydraulic actuator of trim system 30 is a normally high solenoid.

In general, pressure switches 70, 72, 74, 76 are each configured to issue an electrical output signal to control 22 in response to a predetermined fluid pressure being detected by the pressure switch, for diagnostic purposes or for other reasons. Such electrical signals inform control 22 of changes in status of components of control 20. Generation of an output signal by pressure switches 70, 72, 74 can be triggered either by the presence or the absence of a predetermined level of fluid pressure, depending on the configuration of the switch. As used herein, the term "actuated" when used to describe activity of a pressure switch means simply that the switch has issued an output signal to control 22, without limiting the pressure switch to a particular type or configuration.

In the illustrated embodiment, each shift valve 26, 36, 38, 40 has a corresponding pressure switch 76, 70, 72, 74, in fluid communication therewith. Each of pressure switches 70, 72, 74, 76 acts as a binary switch such that it is actuated when the shift valve to which it is coupled is in the stroked position. Control 20 may include other pressure switches in addition to those used to monitor the position of the shift valves. For example, control 20 may use pressure switches to detect changes in position of the trim valves 30, 32, 34.

Table 2 shows a steady state mechanization of components of control 20 during normal operation. The number "1" is used to denote that a component is actuated, while the number "0" denotes that a component is not actuated. The mechanization of trim system 34 is omitted from Table 2 because the application of torque converter clutch 34 is controlled independently by trim system actuator 58.

TABLE 2

| Range | Trim System 30 | Trim System 32 | Shift Valve 36 | Shift Valve 38 | Shift Valve 40 | Shift Valve 26 |
|---|---|---|---|---|---|---|
| Reverse1 | 1 | 1 | 0 | 1 | 1 | 0 |
| Reverse2 | 1 | 1 | 1 | 0 | 1 | 0 |
| Neutral | 1 | 0 | 1 | 1 | 1 | 0 |
| 1st | 1 | 0 | 0 | 1 | 0 | 1 |
| 2nd | 0 | 1 | 0 | 0 | 0 | 1 |
| 3rd | 1 | 0 | 1 | 0 | 0 | 1 |
| 4th | 0 | 1 | 1 | 0 | 1 | 1 |
| 5th | 1 | 0 | 0 | 0 | 1 | 1 |
| 6th | 0 | 1 | 0 | 0 | 1 | 1 |

The configuration of control 20 during normal operation, including two possible reverse ranges, a neutral range, and multiple forward ranges, will now be described.

Figure 2:
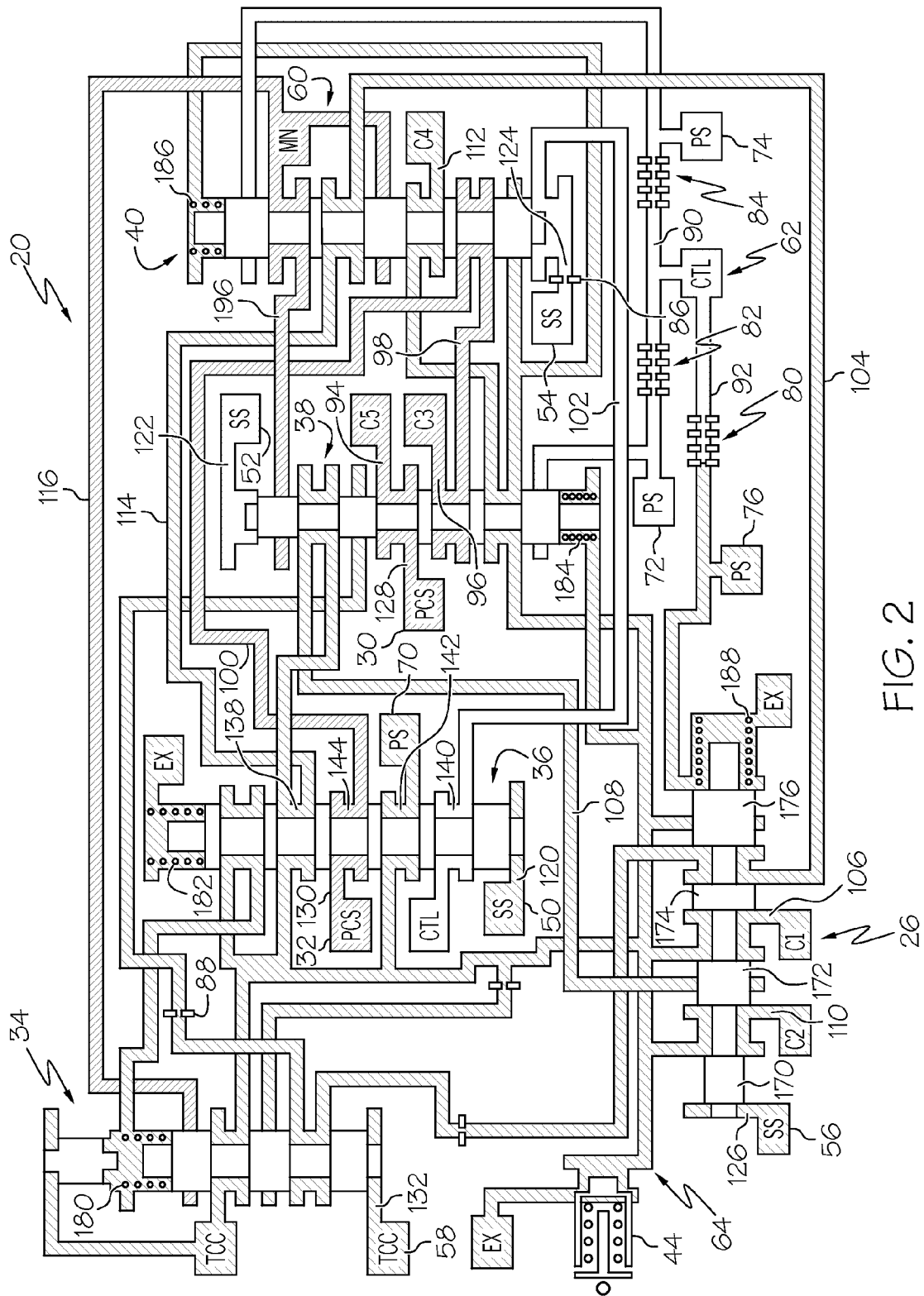
FIG. 2 is a schematic diagram of one embodiment of a control system for a multi-speed transmission for a motor vehicle, showing a fluid passage arrangement and fluid pressure configuration for a reverse range of the transmission.
Figure 3:
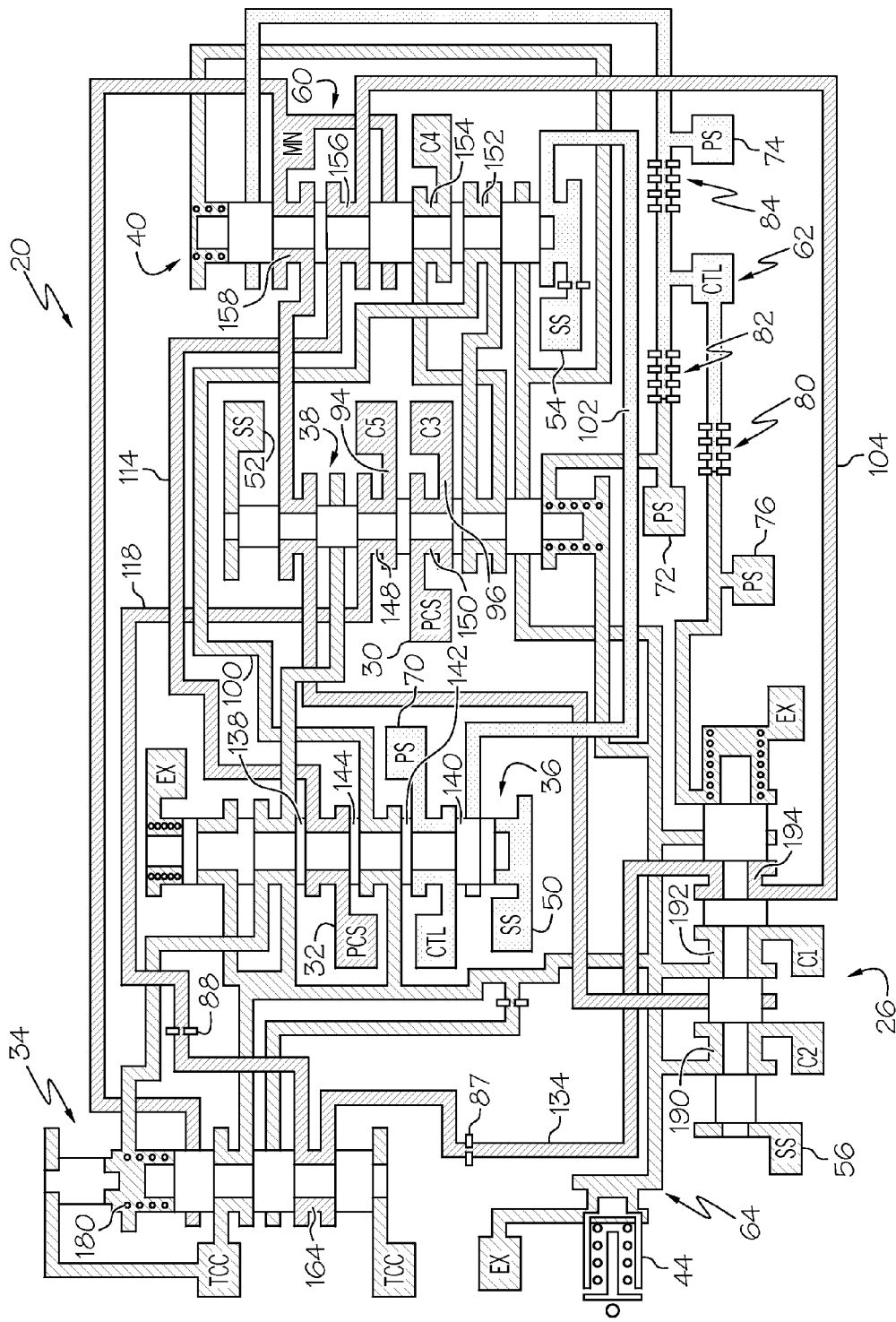
FIG. 3 is a schematic diagram of the embodiment of FIG. 2, showing a fluid passage arrangement and fluid pressure configuration for another reverse range.

As shown in Table 2 and FIGS. 2-3, control 20 provides two alternative reverse ranges. In the reverse range of FIG. 2, denoted as "Reverse1" in Table 2, shift valve actuators 52 and 54 are actuated, causing shift valves 38 and 40 to move to the stroked position while shift valve 36 remains in the destroked position due to actuator 50 being non-actuated. Trim system 30 is fluidly coupled to fluid chamber 148 as a result of actuation of shift valve 38 by actuator 52. As a result, trim system 30 applies main pressure to shift mechanism C5 through fluid chamber 148 and fluid passage 94.

In the Reverse1 range, trim system 32 is fluidly coupled to fluid chamber 150 via fluid chamber 144 of shift valve 36, fluid passage 100, fluid chamber 152 of shift valve 40, and fluid passage 98. As a result, trim system 32 applies main pressure to shift mechanism C3 via fluid chamber 150 and fluid passage 96.

Shift valve 26 is not actuated in the Reverse1 range. However, even if shift valve 26 were actuated in the Reverse1 range, control 20 would remain in the Reverse1 range because the fluid passages 104, 108 (which feed shift mechanisms C1, C2 respectively when shift valve 26 is stroked) are connected to exhaust pressure. Thus, the Reverse1 range can be achieved and maintained regardless of the position of shift valve 26. Moreover, in order for control 20 to fail to a forward range, two valve malfunctions would have to occur, e.g. a failure of shift valve 26 and a failure of at least one of the other shift valves 36, 38, 40, or a failure of shift valve 26 and a failure of one of the trim systems 30, 32.

In the reverse range of FIG. 3, denoted as "Reverse2" in Table 2, the shift mechanisms fed by trim systems 30, 32 are reversed relative to the Reverse1 range. In Reverse2, trim system 30 supplies main pressure to shift mechanism C3 via fluid chamber 150 of shift valve 38, and trim system 32 supplies main pressure to shift mechanism C5 via fluid chamber 138 of shift valve 36, fluid passage 114, fluid chamber 156 of shift valve 40, fluid passage 104, fluid chamber 194 of shift valve 26, fluid passage 134, fluid chamber 164 of trim valve 34, fluid passage 118, orifices 87, 88, fluid chamber 148 of shift valve 38 and fluid passage 94. Shift mechanisms C3 and C5 are applied in both the Reverse1 and Reverse2 ranges.

Figure 4:
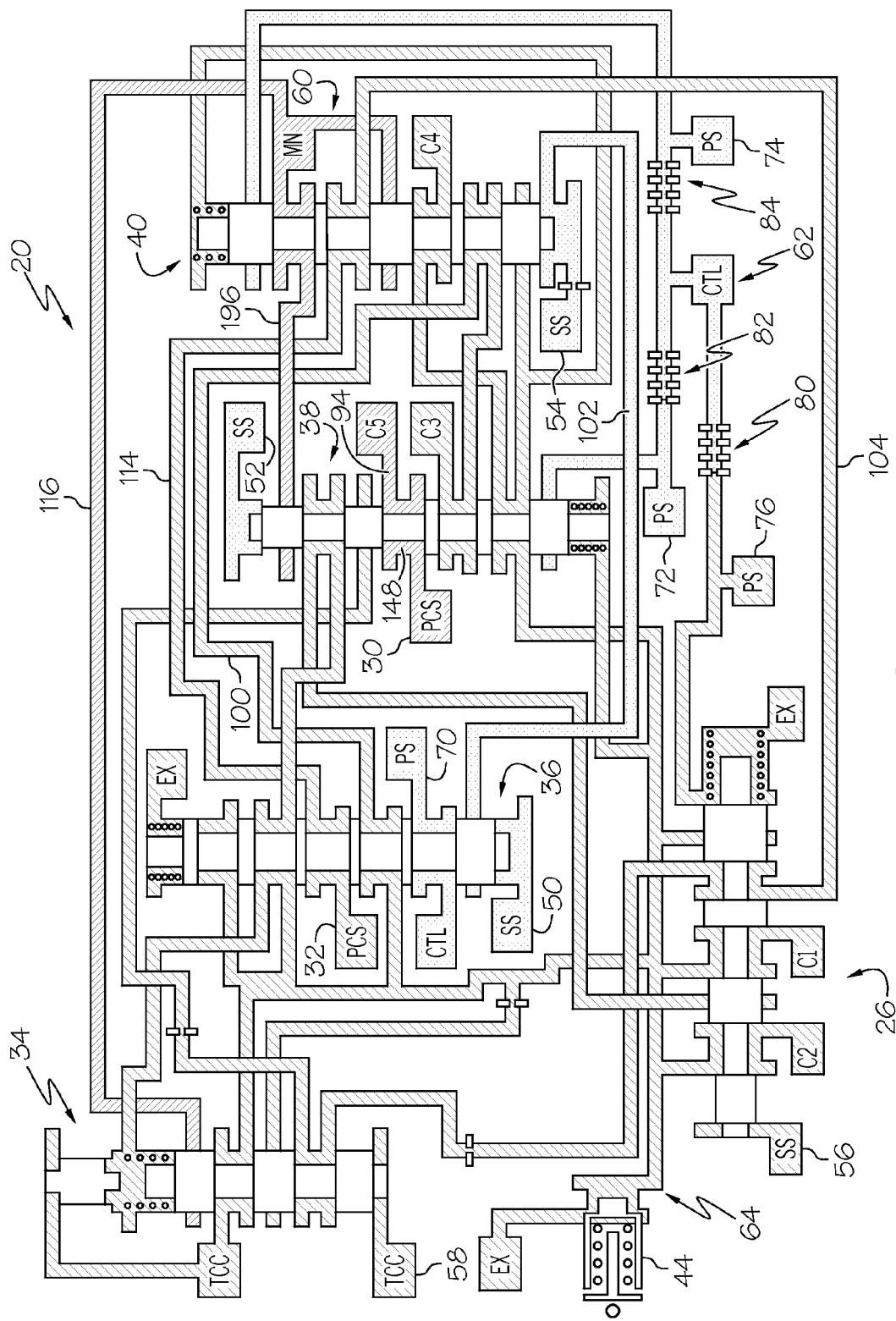
FIG. 4 is a schematic diagram of the embodiment of FIG. 2, showing a fluid passage arrangement and fluid pressure configuration for a neutral range.

A neutral range configuration of control 20 is shown in FIG. 4. In the neutral range, all three shift valves 36, 38, 40 are actuated by control pressure supplied by actuators 50, 52, 54 respectively. As a result, pressure switches 70, 72, 74 are actuated. Shift valve 26 is not actuated in the neutral range and therefore, the neutral range can be attained and maintained independently of shift valve 26.

In the neutral range, trim system 30 supplies main pressure to shift mechanism C5 via passage 128, fluid chamber 148, and passage 94. In order to transition from the neutral range of FIG. 4 to either of the reverse ranges of FIGS. 2 and 3, trim system 32 would have to be actuated and either shift valve 36 (for Reverse1 range) or shift valve 38 (for Reverse2 range) would have to change position. Similarly, in order to transition from the neutral range of FIG. 4 to a forward range, shift valve 26 and at least one other shift valve 36, 38, 40 have to change position. Thus, control 20 provides protection against unintentional shifting out of neutral into a moving range by requiring at least two valves to change position.

Figure 5:
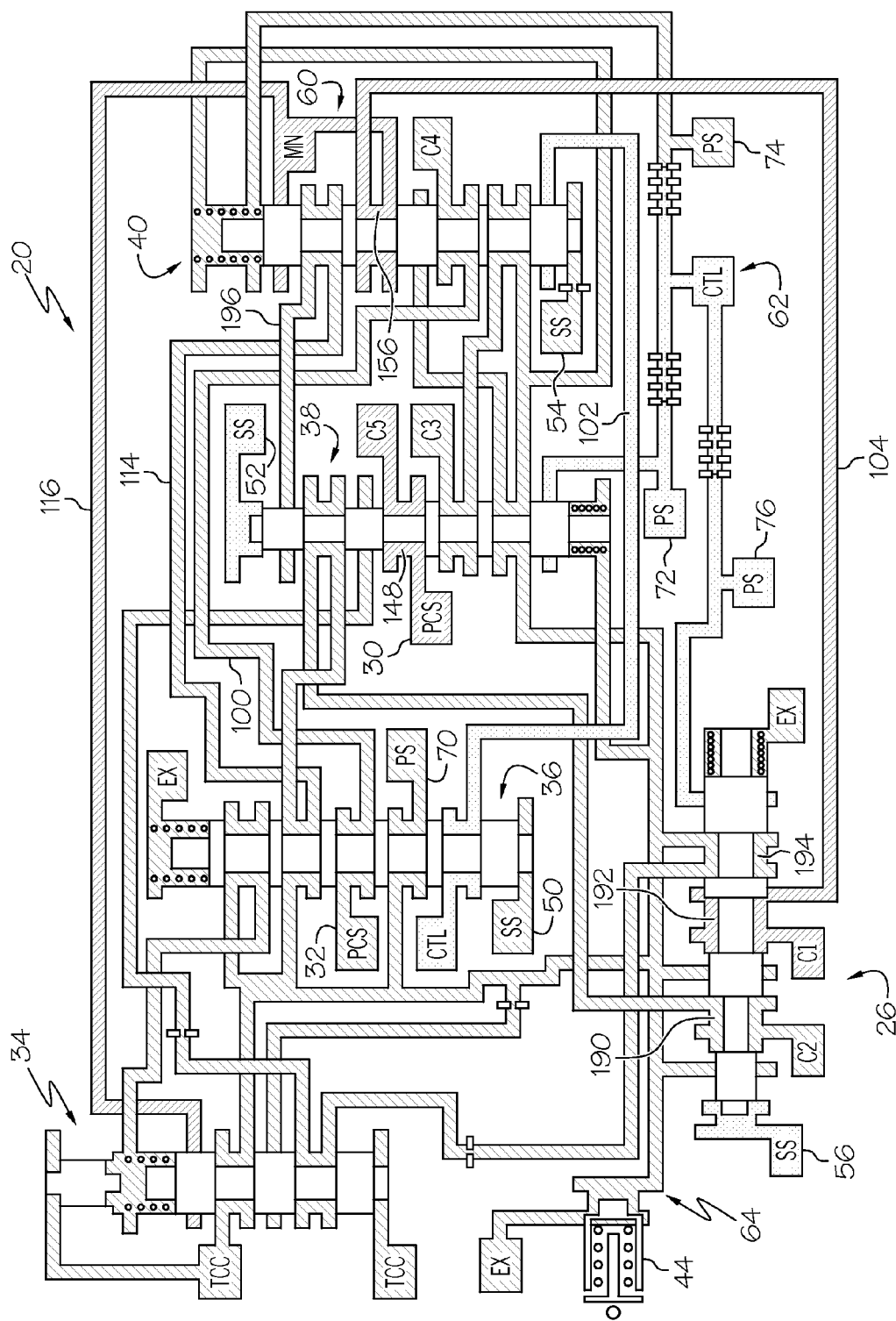
FIG. 5 is a schematic diagram of the embodiment of FIG. 2, showing a fluid passage arrangement and fluid pressure configuration for a first forward range of the transmission.
Figure 6:
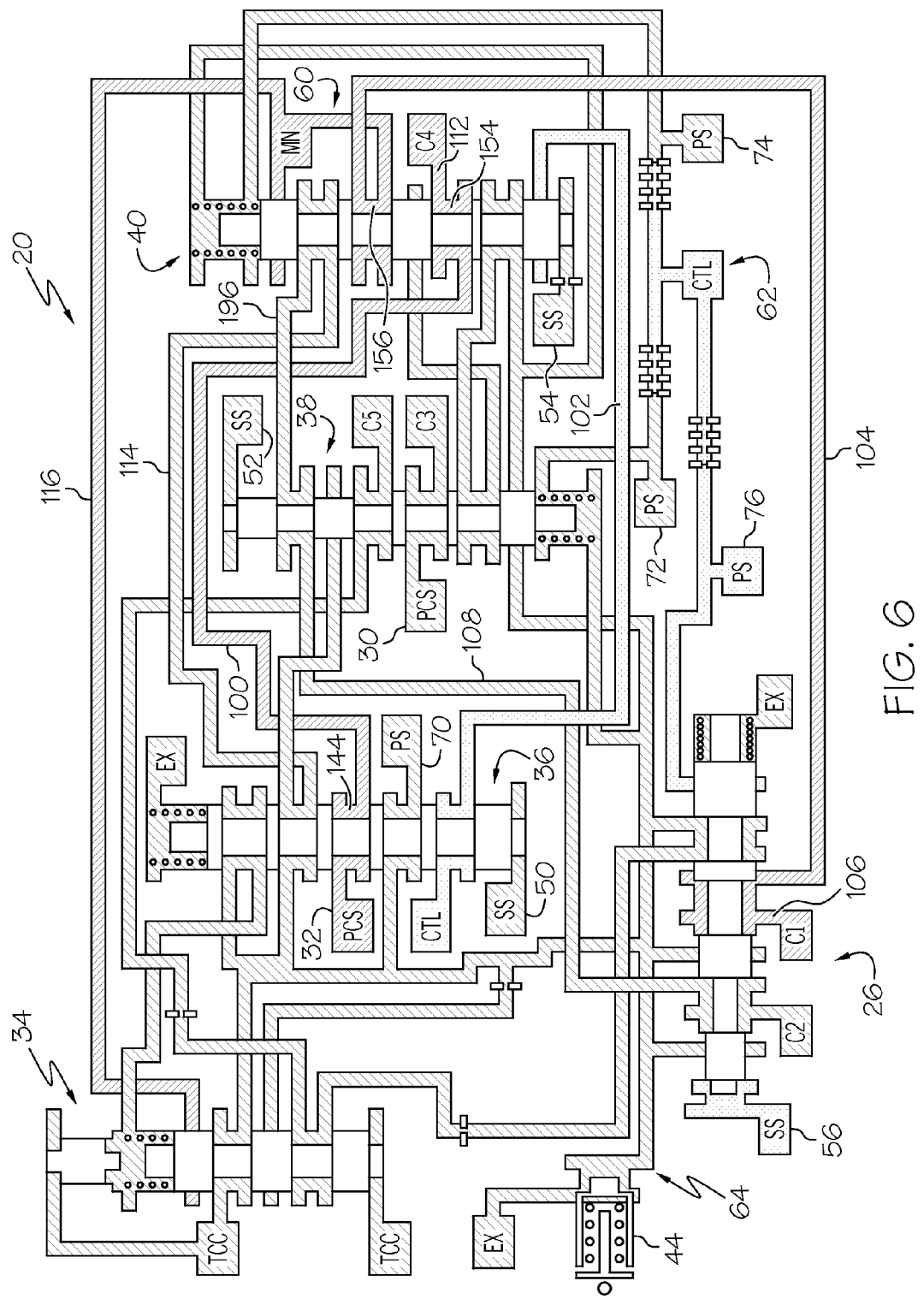
FIG. 6 is a schematic diagram of the embodiment of FIG. 2, showing a fluid passage arrangement and fluid pressure configuration for a second forward range of the transmission.
Figure 7:
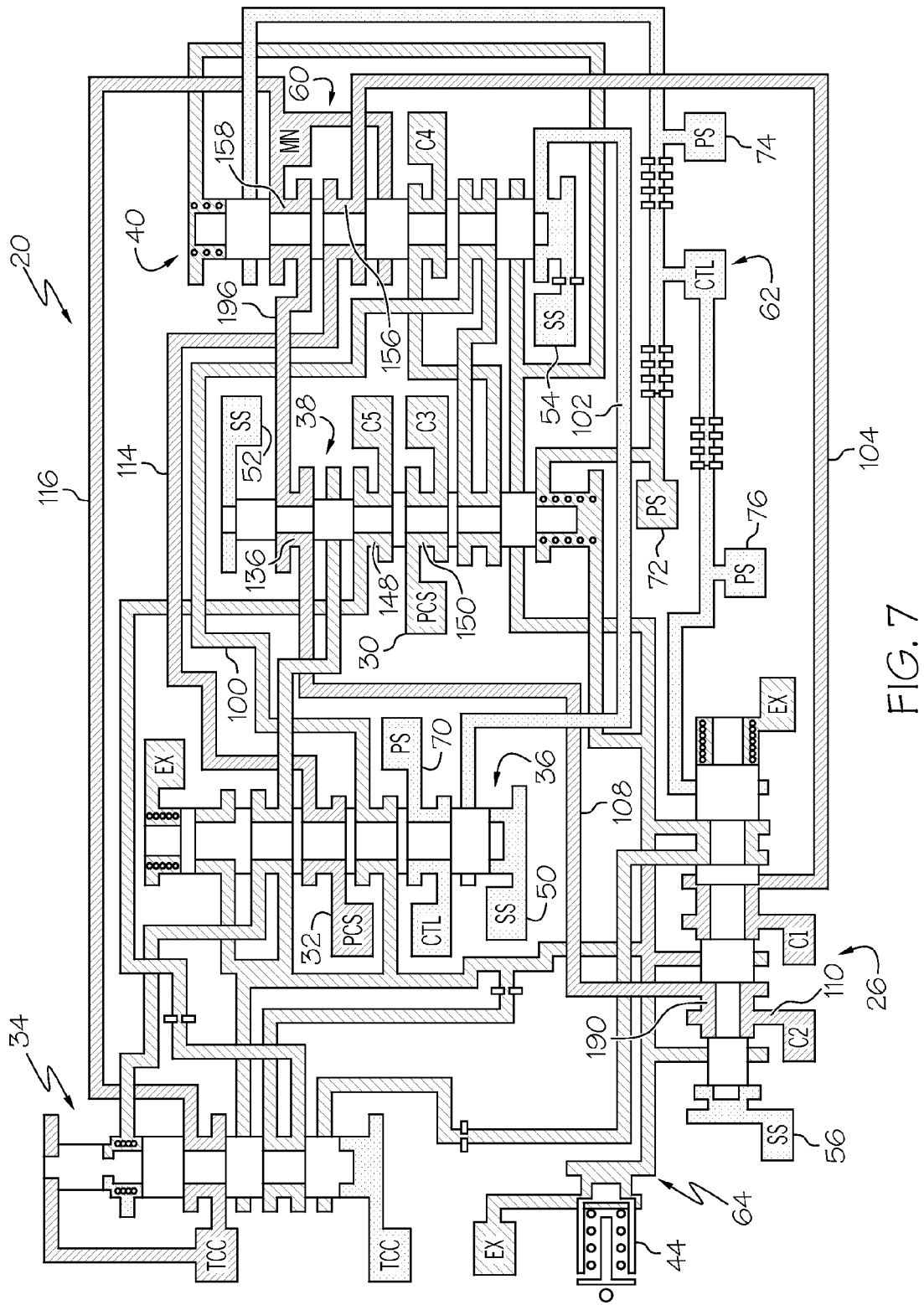
FIG. 7 is a schematic diagram of the embodiment of FIG. 2, showing a fluid passage arrangement and fluid pressure configuration for a fourth forward range of the transmission.

Exemplary forward range configurations of control 20 are shown in FIGS. 5, 6, and 7. Each of the forward ranges requires either shift mechanism C1 or shift mechanism C2 to be applied. Both shift mechanism C1 and C2 are in fluid communication with shift valve 26. When shift valve 26 is not actuated (i.e. destroked), both shift mechanism C1 and shift mechanism C2 are in direct fluid communication with exhaust backfill circuit 64 and EBF valve 44 as shown in FIGS. 2-4. Movement of shift valve 26 to the on or stroked position is initiated by actuator 56 independently of the other valve systems of control 20. Thus, shifting from a non-forward range into a forward range can only be accomplished if shift valve 26 is in the actuated or stroked position shown in FIGS. 5, 6, and 7. Thus, shift valve 26 is in the on or stroked position in all forward ranges, as indicated by Table 2.

Movement of shift valve 26 to the stroked position requires actuation of actuator 56. Actuator 56 is actuated by electrical signals issued by control 22 in response to a forward range request received from range selector 24 in the form of an electrical signal. In this way, control 20 is configured so that transitions from non-forward ranges to a forward range only occur if an electrical forward range request signal has been received by control 22.

FIG. 5 shows a configuration of control 20 for a first forward range in which trim system 30 applies main pressure to shift mechanism C5 via fluid chamber 148 of shift valve 38. Actuation of shift valve 26 by actuator 56 places shift mechanism C1 in fluid communication with main pressure via fluid chamber 192 of shift valve 26, fluid passage 104 and fluid chamber 156 of shift valve 40.

FIG. 6 shows a configuration of control 20 for a second forward range in which trim system 30 applies main pressure to shift mechanism C4 via fluid chamber 144 of shift valve 36, passage 100, and fluid chamber 154 of shift valve 40. Main pressure is applied to shift mechanism C1 as described above with regard to FIG. 5.

FIG. 7 illustrates a configuration of control 20 for a fourth forward range in which main pressure is applied to shift mechanisms C1 and C2. Main pressure is applied to shift mechanism C1 as described above with regard to FIG. 5. Main pressure is applied to shift mechanism C2 via fluid chamber 190 of shift valve 26, fluid passage 108, fluid chamber 136 of shift valve 38, fluid passage 196, and fluid chamber 158 of shift valve 40. FIG. 7 also illustrates the application of torque converter clutch 14 by actuator 58, which by applying control pressure to the head of trim valve 34, connects main pressure from passage 116 with the torque converter clutch 14. Since main pressure flows through passage 116 in all of the normal modes of operation of control 20, torque converter clutch 14 can by actuated by actuator 58 at any time (i.e., in any range).

Table 3 shows a steady state mechanization of components of control 20 in a failure mode resulting from an electrical failure. The number "1" is used to denote that a component is actuated, while the number "0" denotes that a component is not actuated. The letter "H" is used to indicate that a component is hydraulically held in position in the absence of electrical input. The mechanization of trim system 34 is omitted since the torque converter clutch 34 is not applied during an electrical failure.

TABLE 3

| Range | Fails To | Trim System 30 | Trim System 32 | Shift Valve 36 | Shift Valve 38 | Shift Valve 40 | Shift Valve 26 |
|---|---|---|---|---|---|---|---|
| Reverse 1 | Neutral (C5) | 1 | 0 | 0 | H | H | 0 |
| Reverse2 | Neutral (C3) | 1 | 0 | 0 | 0 | H | 0 |
| Neutral | Neutral (C5) | 1 | 0 | 0 | H | H | 0 |
| 1st | $1^{st}$ | 1 | 0 | 0 | H | 0 | H |
| $2^{nd}$ | $3^{rd}$ | 1 | 0 | 0 | 0 | 0 | H |
| $3^{rd}$ | $3^{rd}$ | 1 | 0 | 0 | 0 | 0 | H |
| $4^{th}$ | $5^{th}$ | 1 | 0 | 0 | 0 | H | H |
| $5^{th}$ | $5^{th}$ | 1 | 0 | 0 | 0 | H | H |
| $6^{th}$ | $5^{th}$ | 1 | 0 | 0 | 0 | H | H |

FIGS. 8-13 show the configuration of control 20 in the event of an electrical failure in the Reverse1, Reverse2, neutral, and first, second and fourth forward ranges in accordance with Table 3. Trim system 30 is actuated by a normally high solenoid and is therefore actuated in the event of an electrical failure. Thus, trim system 30 applies main pressure to either shift mechanism C5 or shift mechanism C3, depending on the position of shift valve 38, in the event of an electrical failure.

When shift valve 38 is stroked during normal operation, trim system 30 is fluidly coupled to shift mechanism C5. This is the case in the Reverse1, neutral, and first forward ranges as shown in FIGS. 2, 4 and 5. If an electrical failure occurs in one of these ranges, actuator 52 will not deliver pressure to shift valve 38 because of the absence of electrical input. However, the stroked position of shift valve 38 is maintained because trim system 30 applies main pressure to the differential area d3 of land 168 of shift valve 38 via fluid chamber 148. This is shown in FIGS. 8 (Reverse1), 10 (neutral), and 11 ($1^{st}$ forward range).

Since normally high trim system 30 controls both shift mechanisms C5 and C3, and the reverse ranges require both C3 and C5 to be applied, in the event of an electrical failure, the reverse ranges cannot fail to reverse. Instead, both of the reverse ranges will fail to a neutral range as shown in FIGS. 8 and 9 and indicated in Table 3 above.

The Reverse1 range fails to a neutral state in which the C5 shift mechanism is applied as shown in FIG. 8. The Reverse2 range fails to a neutral state in which the C3 shift mechanism is applied as shown in FIG. 9. The neutral range fails to the failure mode C5 neutral state shown in FIG. 10. The failure mode C5 and C3 neutral states cannot be shifted out of as long as the electrical failure occurs, because shifting out of neutral to either a reverse range or forward range requires electrical input.

Figure 9:
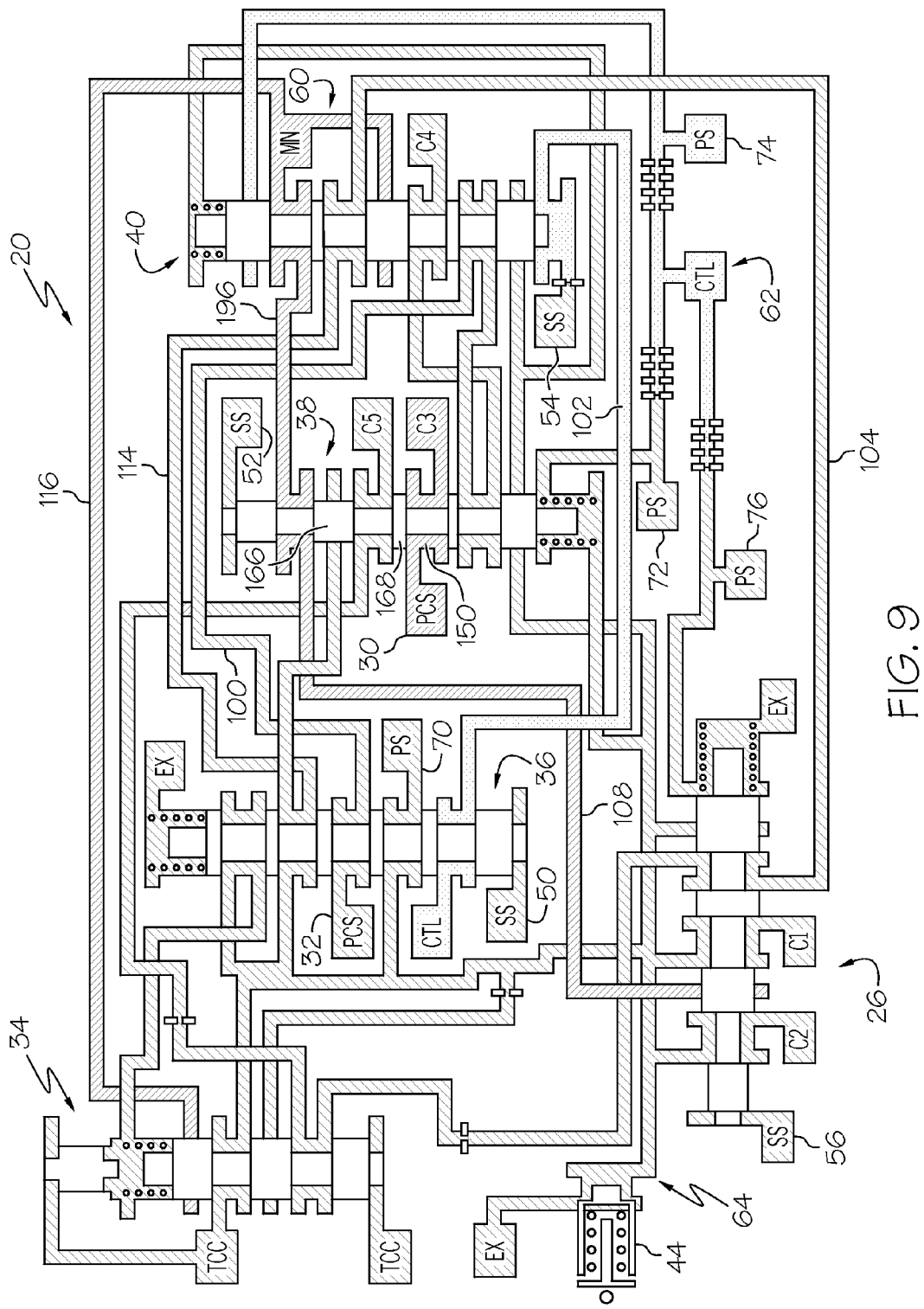
FIG. 9 is a schematic diagram of the embodiment of FIG. 2, showing a fluid passage arrangement and fluid pressure configuration for the reverse range of FIG. 3, in a failure mode in response to an electrical failure.

FIGS. 8, 9, and 10 also show how the flow of control pressure to the head of shift valve 40, via fluid chamber 140 of shift valve 36 and fluid passage 108, maintains the stroked position of shift valve 40 in the absence of electrical input to actuator 54. When shift valve 40 is stroked, main pressure is blocked from entering passage 104, which is in fluid communication with shift valve 26.

FIGS. 11, 12, and 13 show failure mode configurations of control 20 for forward ranges. As shown in FIG. 11, the first forward range is maintained in the event of an electrical failure due to the latching of shift valve 38 by pressure applied to the differential area of land 168, and the latching of shift valve 26. Pressure applied to the differential area of land 174 maintains the stroked position of shift valve 26 in the absence of electrical input to actuator 56.

The second and third forward ranges fail to the third forward range in the event of an electrical failure, as shown in FIG. 12. The shift valve 26 is latched as described above with reference to FIG. 11. During normal operation, shift valve 38 is destroked in the second and third forward ranges. The destroked position is maintained in the event of electrical failure because the lands below land 168 have the same diameter as land 168. However, shift mechanism C3 is applied (if the failure occurred in the second forward range) or maintained (if the failure occurred in the third forward range) because the actuator for trim system 30 is of the normally high type.

The fourth and higher forward ranges fail to the fifth forward range in the event of an electrical failure as shown in FIG. 13. In the electrical failure mode for these ranges, shift valve 26 is latched in the stroked position by pressure applied to the differential area of land 172. Thus, main pressure is supplied to shift mechanism C2 as described above with regard to FIG. 7. Shift valve 40 is hydraulically latched by control pressure via passage 102 as described above. Trim system 30 applies main pressure to shift mechanism C3 because shift valve 38 is destroked.

In all forward ranges, the latching features on shift valve 26 in communication with shift mechanisms C1 and C2 as described above hold shift valve 26 in the stroked position as long as the transmission is receiving a forward range command from electrical control 22 or range selector 24, thereby providing protection against a mechanical failure of shift valve 26 that might otherwise cause shift valve 26 to erroneously move to the destroked position.

The hydraulic latching of shift valves 26, 38 and 40 in the various instances described above is maintained unless the pressure of the hydraulic fluid in the control system decreases to a point where it can no longer overcome the bias of the valve's return spring, such as is the case when the source of pressurized hydraulic fluid (e.g., the engine pump) is turned off.

The present disclosure describes patentable subject matter with reference to certain illustrative embodiments. The drawings are provided to facilitate understanding of the disclosure, and may depict a limited number of elements for ease of explanation. Except as may be otherwise noted in this disclosure, no limits on the scope of patentable subject matter are intended to be implied by the drawings. Variations, alternatives, and modifications to the illustrated embodiments may be included in the scope of protection available for the patentable subject matter.

The invention claimed is:

1. An electro-hydraulic control for a multi-speed vehicle transmission, comprising:
   a plurality of actuators each configured to output fluid pressure in response to electrical shift request signals;
   a plurality of shift valves in fluid communication with the actuators and with each other to selectively deliver fluid pressure to a plurality of shift mechanisms of the transmission, the plurality of shift valves comprising:
   a single-diameter shift valve;
   a two-diameter shift valve; and
   a three-diameter shift valve,
   wherein (i) the transmission is operable in a plurality of forward ranges, (ii) the three-diameter shift valve has a first position when the transmission is in each one of the plurality of forward ranges, and (iii) the three-diameter shift valve has a second position when the transmission is not in one of the plurality of forward ranges.

2. The electro-hydraulic control of claim 1, wherein the single-diameter shift valve is selectively fluidly coupled to a first shift mechanism, the two-diameter shift valve is selectively fluidly coupled to second and third shift mechanisms, and the three-diameter shift valve is selectively fluidly coupled to fourth and fifth shift mechanisms.

3. The electro-hydraulic control of claim 1, wherein the two-diameter shift valve comprises a spool, a head adjacent one end of the spool, a return spring adjacent the other end of the spool, a first land disposed adjacent the head, and a second land adjacent the return spring, and the first land has a smaller diameter than the second land.

4. The electro-hydraulic control of claim 1, comprising another single-diameter shift valve fluidly coupled to another shift mechanism.

5. The electro-hydraulic control of claim 1, wherein the actuators are on/off actuators.

6. The electro-hydraulic control of claim 1, comprising a plurality of trim systems fluidly coupled to the shift valves, wherein the number of trim systems is less than the number of shift valves.

7. The electro-hydraulic control of claim 1, comprising a plurality of pressure switches fluidly coupled to the shift valves.

8. The electro-hydraulic control of claim 1, wherein the three diameters of the three-diameter shift valve define a latching feature that maintains the first position of the three-diameter shift valve in the event of an electrical failure.

9. The electro-hydraulic control of claim 1, wherein the two-diameter shift valve comprises a spool, a head adjacent one end of the spool, a return spring adjacent the other end of the spool, first and second lands disposed adjacent the head, and third and fourth lands adjacent the return spring, and the first and second lands have smaller diameters than the third and fourth lands.

10. The electro-hydraulic control of claim 9, wherein the first and second lands have substantially the same diameter and the third and fourth lands have substantially the same diameter.

11. The electro-hydraulic control of claim 1, wherein the three-diameter shift valve comprises a spool, a head adjacent one end of the spool, a return spring adjacent the other end of the spool, a first land adjacent the head, a third land adjacent the return spring, and a second land intermediate the first land and the third land, and the second land has a larger diameter than the first land and the third land has a larger diameter than the second land.

12. The electro-hydraulic control of claim 11, comprising a fourth land adjacent the third land, wherein the fourth land has substantially the same diameter as the third land.

13. An electro-hydraulic control for a multi-speed vehicle transmission operable in a plurality of forward ranges, comprising:
   a plurality of actuators each configured to output fluid pressure in response to electrical shift request signals; and
   a plurality of shift valves in fluid communication with the actuators and with each other to selectively deliver fluid pressure to a plurality of shift mechanisms of the transmission, the plurality of shift valves comprising a multiple-diameter shift valve, the multiple diameter shift valve having a first position when the transmission is not in one of the plurality of forward ranges, a second position when the transmission is in each one of the plurality of forward ranges, and a latching feature that maintains the second position if an electrical failure occurs while the transmission is in one of the plurality of forward ranges.

14. The electro-hydraulic control of claim 13, comprising a pressure switch fluidly coupled to the multiple-diameter shift valve to change state in response to changes in position of the multiple-diameter shift valve, wherein the latching feature maintains the state of the pressure switch if an electrical failure occurs while the transmission is in a forward range.

15. The electro-hydraulic control of claim 13, wherein the electro-hydraulic control is arranged so that if the transmission transitions from a neutral range to a moving range, one of the actuators changes state and one of the shift valves changes position.

16. The electro-hydraulic control of claim 13, wherein the multiple-diameter shift valve is selectively fluidly coupled to a first shift mechanism by a first fluid passage that is defined between a first land and a second land of the multiple-diameter shift valve, and the second land has a larger diameter than the first land.

17. The electro-hydraulic control of claim 16, wherein the multiple-diameter shift valve is maintained in the second position by fluid pressure applied to the first fluid passage if the transmission is in a fourth or higher forward range when the electrical failure occurs.

18. The electro-hydraulic control of claim 16, wherein the multiple-diameter shift valve is selectively fluidly coupled to a second shift mechanism by a second fluid passage that is defined between the second land and a third land of the multiple-diameter shift valve, and the third land has a larger diameter than the second land.

19. The electro-hydraulic control of claim 18, wherein the multiple-diameter shift valve comprises a spool, a head adjacent one end of the spool, and a return spring adjacent the other end of the spool, the first land is nearer to the head than the return spring, the third land is nearer to the return spring than the head, and the second land is intermediate the first land and the third land.

20. The electro-hydraulic control of claim 18, comprising a trim system to selectively supply a variable fluid pressure to the first and second fluid passages.

21. The electro-hydraulic control of claim 18, wherein the multiple-diameter shift valve is maintained in the second position by fluid pressure applied to the second fluid passage if the transmission is in a first, second, or third forward range when the electrical failure occurs.

* * * * *